Oct. 14, 1952 J. S. ROGINSKI 2,613,731
HEADREST
Filed Nov. 30, 1949 2 SHEETS—SHEET 1
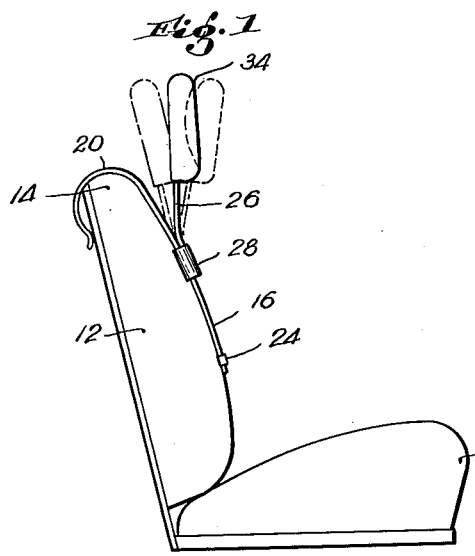
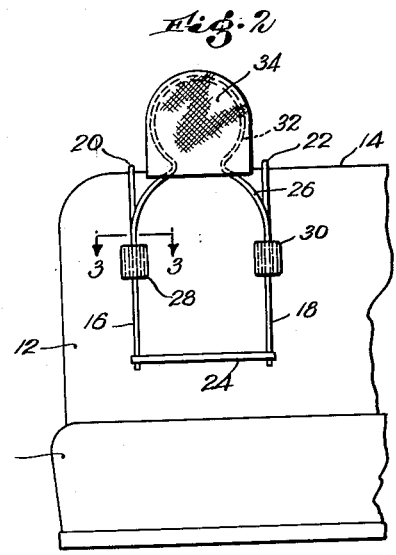
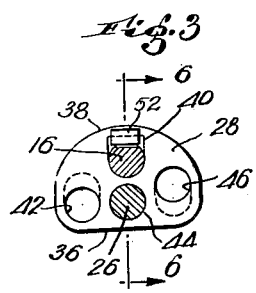
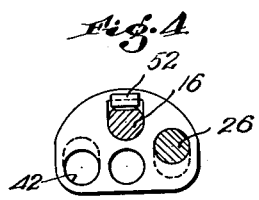
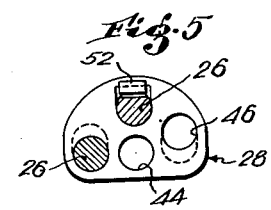
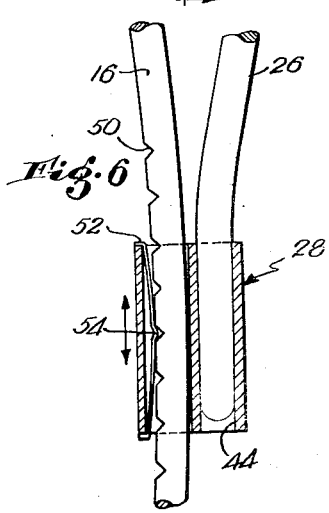
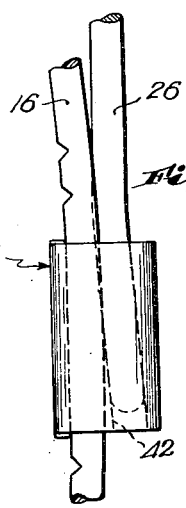
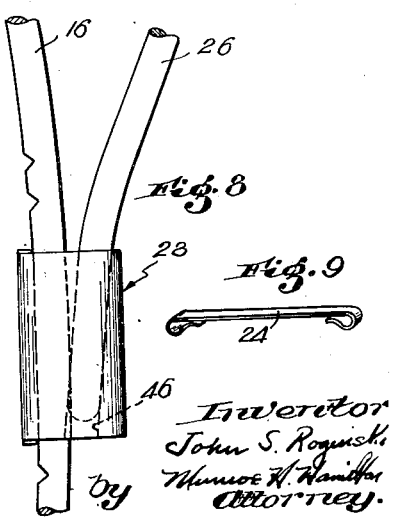
Inventor
John S. Roginski
by Munroe W. Hamilton
Attorney

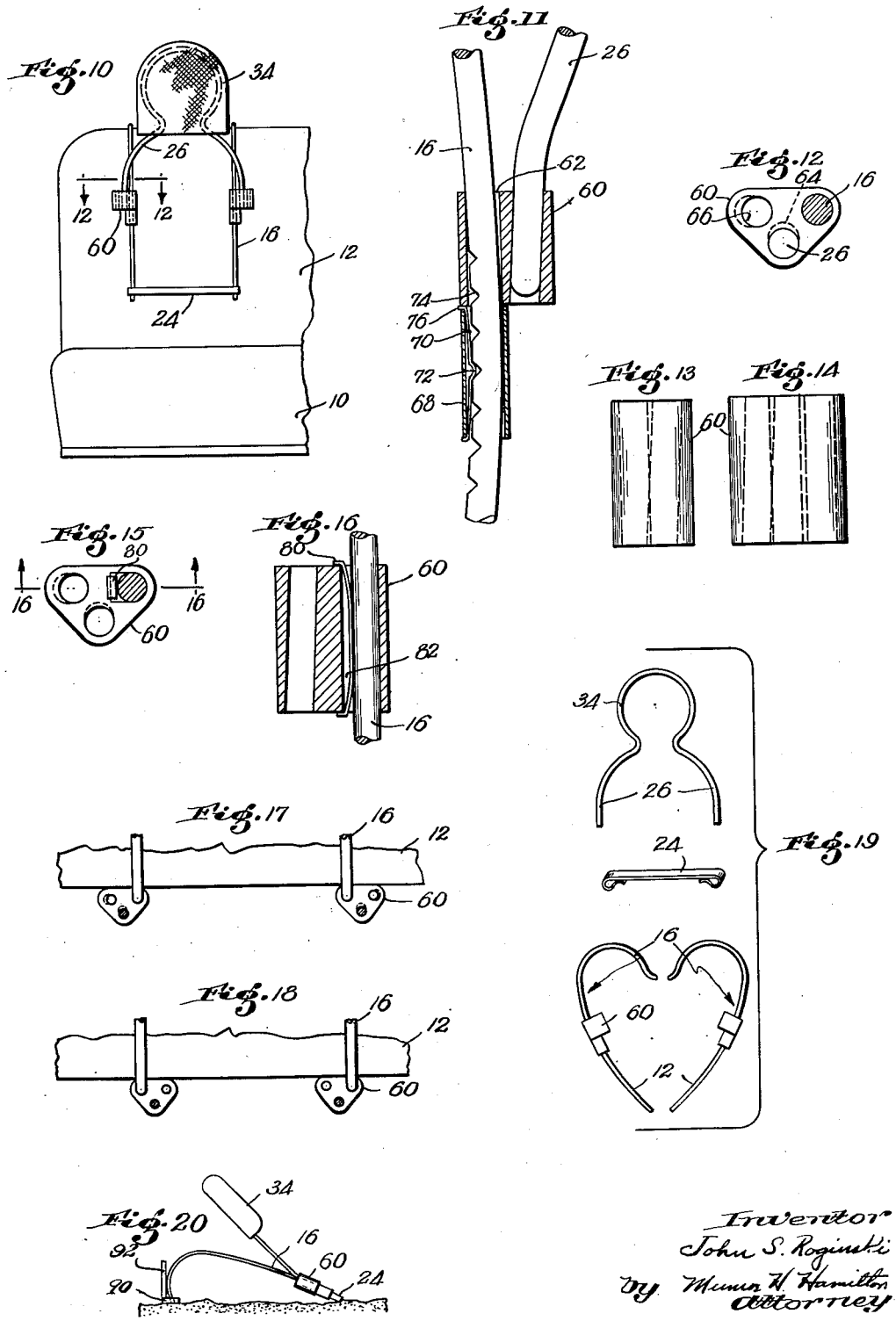

Patented Oct. 14, 1952

2,613,731

UNITED STATES PATENT OFFICE 2,613,731

HEADREST

John S. Roginski, Boston, Mass.

Application November 30, 1949, Serial No. 130,265

8 Claims. (Cl. 155—174)

This invention relates to an improved headrest of the type designed to be removably attached to the back of an automobile seat, chair, and the like, in order to furnish a convenient support against which the head may be received either for purposes of rest or for inducing sleep.

It is an object of the invention to devise an improved headrest of the general character indicated, and to provide in such a structure a unique type of demountability and adjustability such that the device may be very easily and quickly assembled, installed and adjusted on a seat such as an automobile seat in order to furnish a correct height for each individual user.

It is a further object of the invention to combine with the foregoing height adjusting structure, means for varying the angle of inclination at which the head may be supported at any desired height, thus to make available a range of inclination suited either to merely temporarily reclining or to longer periods of rest with sleep being induced.

Another object of the invention is to provide a headrest assembly made of a very small number of parts which are easily disassembled or put together and which may be readily stored as a compact, light package when not in use.

It is still a further object of the invention to devise a type of headrest construction which can be very cheaply manufactured with a minimum number of cutting and forming operations being required in order to provide the required range of flexibility and adjustability.

These and other objects and novel features will be more fully understood and appreciated from the following description of a preferred embodiment of the invention shown in the accompanying drawings, in which Fig. 1 is a view in side elevation illustrating an automobile seat with the headrest of the invention being installed on the back of the seat in one desired position of height and angularity or inclination, and with alternate positions of inclination indicated in broken lines;

Fig. 2 is a front elevational view further illustrating the automobile seat shown in Fig. 1, with the headrest of the invention attached and also revealing the slide means for adjustably securing the upper section of the headrest to the lower engaged section;

Fig. 3 is a plan cross-section taken on the line 3—3 of Fig. 2;

Fig. 4 is a plan view and partial cross-section of the slide means shown in Fig. 3, but further illustrating the upper section of the headrest in a furthermost inclined position such as shown in dotted lines at the left of Fig. 1;

Fig. 5 is another view similar to Figs. 3 and 4 in which the upper section of the headrest is shown in a fully advanced position of inclination as suggested in dotted lines at the right-hand side of Fig. 1;

Fig. 6 is a view in cross-section taken on the line 6—6 of Fig. 3;

Fig. 7 is an elevational view showing fragmentarily the headrest frame sections with the upper section in a wholly inclined position such as indicated in Fig. 4; and Fig. 8 is another fragmentary elevational view illustrating headrest sections in a relatively advanced state of inclination such as is represented in Fig. 5;

Fig. 9 is a detail perspective view of the cross bar element for stiffening the frame;

Fig. 10 is another fragmentary front elevational view illustrating a frame and headrest secured together by a modified form of slide construction;

Fig. 11 is a central vertical cross section taken through the modified slide shown in Fig. 10 in one typical position thereof;

Fig. 12 is a plan cross section taken on the line 12—12 of Fig. 10;

Fig. 13 is a side elevational view illustrating the slide shown in Fig. 12 in one position of rotation about the frame 16;

Fig. 14 is another side elevational view of the slide shown in Figs. 10–12 inclusive, indicating another position which the frame may assume by angular guideways formed in the slide;

Figs. 15 and 16 illustrate still another slide arrangement of the same general type shown in Figs. 10–14 inclusive but further illustrating a recessed locking spring arrangement for securing the slide in position;

Figs. 17 and 18 further illustrate fragmentarily in plan view positions of rotation of the slide members shown in Figs. 15 and 16 about the headrest frame 16 to develop varying degrees of pitch or angularity in the manner noted above;

Fig. 19 is a composite view showing in plan the several parts of the headrest, frame and supporting sections; and Fig. 20 is a detail plan view of another modification.

In the structure shown in the drawings, numeral 10 denotes the lower section of an automobile seat and numeral 12 denotes the back of the seat formed in the usual manner with a padded upper extremity 14, about which the headrest device of the invention is adapted to be engaged as shown. The headrest is formed with two principal parts, including a seat engaging frame made up of two spaced-apart straps 16 and 18 having their upper extremities bent over to form retaining hook portions 20 and 22. A cross piece 24 maintains the lower extremities of the strap in spaced apart relation and may be secured thereto by any convenient type of fastening such as a snap, clip, flat spring or the like. (See Fig. 9.)

The second principal part of the headrest structure includes an upper section consisting of a pillow bracket 26, formed with spaced-apart ends arranged to detachably engage with respective slide supports 28 and 30 located on the straps 16 and 18 as noted in Figs. 1 and 2. The upper portion of the pillow bracket is bent into a generally circular form as denoted by the dotted line 32 showing of Fig. 2, about which is adapted to be disposed a pillow 34 which latter element may conveniently be in the form of an enveloping body.

The frame and pillow bracket may be constructed from any light, flexible material such as metal, plastic, and the like, and in one preferred form will be constructed from a cheap metal wire characterized by a limited degree of resilience in order to impart yieldability to the headrest upper section when secured in the engaging frame.

Adjusting slide support 28 has been further illustrated in Figs. 3 and 6 in order to more fully disclose the nature of this member. As will be noted in the figures referred to, the slide support is formed with a relatively flat, wide face 36 and an opposite convex surface 38. The contours described are selected to avoid on the one hand any outwardly projecting mass such as would be objectionable on the part of a user resting against the headrest, and on the other hand to provide a curved surface more readily adapting itself to sinking into the back 12 of the automobile seat.

Located through the slide support 28, between the two surfaces referred to, are formed guideways 40, 42, 44, and 46. Of these, guideway 40 serves as a passageway through which the strap 16 may extend and by which the slide may be slid into various positions of adjustment. Guideway 42 will, as noted by the dotted line shown in Fig. 7, permit the headrest 26 to be held therein in one position of angularity.

Guideway 44 serves to locate the headrest 26 in an intermediate position as shown in Figs. 3 and 6, while guideway 46 serves to locate member 26 in an opposite position of angularity as noted in Figs. 5 and 8. It will be seen that in each of these arrangements, the slide member achieves the purpose sought by a series of guideways which lie in an angularly disposed position with respect to one another and with respect to the straps 16 and 18 on which the slide support is held.

Numeral 50 refers to a notched surface or surfaces on the two lower extremities of the frame 16, and a flat spring 52 is detachably secured in the slide in position to force a center projection 54 into engagement with the notched surfaces and thus secure the slide element at any desired point on the frame extremities.

It will be apparent that by the single pair of slide supports a relatively wide range of adjustments may be achieved. Thus by sliding the headrest and slide support members up and down the straps 16 and 18, any desired vertical adjustment may be quickly made. Similarly in any such vertical position as is chosen by merely removing the headrest section and locating the ends of this member in any one of the three sets of guideways, a range of inclination is available.

Attention is directed to the form of invention illustrated in Fig. 10–14 inclusive in which the slide member 60 is provided consisting of a substantially triangularly shaped block having three openings or guideways formed therethrough. One of the guideways is designed to receive the lower extremities of the frame 16, and in addition, to permit rotation about the longitudinal axis of the guideway, with the result that the remaining two guideways may be moved into varying positions as will be apparent from an inspection of Figs. 17 and 18. The numeral 62 refers to the guideway in which the frame portions 16 are received, while guideway 64 refers to the forward occurring guideway as viewed in Fig. 10, and numeral 66 denotes the remaining guideway, more clearly shown in Fig. 12.

With this form of slide, there is provided a locking sleeve 68 adapted to surround the frame sections 16 and be slidably mounted thereon, to position the sleeve in a position immediately below the slide 60 as suggested in Fig. 11, for example. The sleeve includes an internal flat spring 70 formed with a notched portion 72 adapted to move into engagement with notched surfaces 74, on the inner sides of the frame section 16. The spring member 70 at its upper extremity preferably is formed with a hooked edge 76, to facilitate longitudinal adjustment of the sleeve on the frame.

In Figs. 15 to 18 inclusive, there is shown another arrangement employing the same triangular slide described in Figs. 10 to 14. A spring member 80 in this case is detachably mounted in an opening 82 and in back of the frame section 16 as is more clearly shown in Fig. 16. This specific arrangement allows the triangular slide to be rotated into different positions such as has been suggested in Figs. 17 and 18, with the frame extremities 16 successively falling into new positions in the respective guideways as the slides are adjusted in one direction or another.

It will be seen that upon rotating the triangular type of slide, the inclined guideways will reverse the angle of inclination of the headrest section, with the result that a wider range of adjustability is secured and in all positions of adjustment the slide will lie with a flat face or bearing surface for contact with the back of the seat 12. In this relative position the slide presents a very unobjectionable projection against which the back of the user may rest.

Another desirable application of the invention is in connection with the device shown in Fig. 20 in which the curved frame portions 16 are supported in a lowered position on a base member 90 adapted to rest on the ground and having holes therein for receiving the extremities of members 16. Located on the base member 90 is a rigid panel or upright 92 extending upwardly into position to cooperatively support the headrest when in a flattened position such as may result from a person lying in a prone state with the head supported on the headrest member.

It will be evident that I have provided a simple and effective headrest structure which may be very easily separated into its component parts in a convenient assembly such as shown in Fig. 19, and the parts may be brought together and stored in a compact package. The several elements are very quickly attached to one another and to the seat of an automobile, chair, or other piece of furniture, with a minimum amount of effort.

While I have shown preferred embodiments of the invention, it should be understood that changes and other modifications may be resorted to in keeping with the spirit of the invention as defined by the appended claims.

Having thus described my invention, what I claim is:

1. An article of the character described comprising a frame having bent upper extremities for engaging over a seat, a pair of slide elements adjustably mounted on the frame, each of the slide elements being formed with a plurality of guideways extending therethrough, the guideways occurring angularly with respect to one another, and a headrest section detachably secured in one set of guideways.

2. An improved headrest for automobile seats, including a seat-engaging frame having two spaced-apart rods formed at their upper ends with retaining portions, a pair of adjusting slides mounted on the rods at points intermediate the ends, said slides each having a pair of guideways lying in spaced relation to the rods, said guideways being disposed angularly with respect to one another, a pillow bracket presenting a pair of depending arms detachably secured in the guideways and extending upwardly from the frame, and said slides being rotatable about the frame rods to move the pillow bracket into varying positions of angularity with respect to the frame.

3. A device as described in claim 2 in which the slides include holding means for adjustably securing the slides in any desired position on their respective rods.

4. A device as described in claim 2 in which the slides include spring means having a projection formed at one side, and the said spaced apart rods are provided with notched surfaces for releasably engaging with the projection on the spring means.

5. A device as described in claim 2 in which the slides are formed with a plurality of guideways extending therethrough, each of the guideways occurring in progressively inclined positions to provide for different headrest positions.

6. An improved head rest comprising a frame having two spaced apart supporting members, said supporting members presenting curved extremities, a pair of slide elements adjustably mounted on the supporting members, said slide elements being formed with guideways extending therethrough, a flexible pillow bracket including spaced apart arms received in the said guideways of the slides and extending angularly away from the frame, and base means for holding the spaced apart supporting members in fixed relation.

7. A device as described in claim 6, in which the base means includes an upright member arranged in position to limit the path through which the pillow bracket may flex when a weight is disposed thereagainst.

8. A device as described in claim 6, in which the base comprises a substantially flat block having holes formed therethrough at opposite ends of the block for receiving the curved ends of the spaced apart supporting members, and a rigid head support element fixed in the block and extending upwardly into a position to limit the path through which the pillow bracket may flex on the frame when a weight is disposed thereagainst.

JOHN S. ROGINSKI.

REFERENCES CITED

The following references are of record in the file of this patent:

UNITED STATES PATENTS

| Number | Name | Date |
| --- | --- | --- |
| 48,586 | Phelps | July 4, 1865 |
| 418,004 | Frick | Dec. 24, 1889 |
| 570,208 | Harry | Oct. 27, 1896 |
| 792,669 | Schaff | June 20, 1905 |
| 1,565,514 | Schumacher | Dec. 15, 1925 |

FOREIGN PATENTS

| Number | Country | Date |
| --- | --- | --- |
| 140,204 | Germany | Apr. 9, 1903 |